United States Patent
Kowalski

[11] Patent Number: 6,058,481
[45] Date of Patent: May 2, 2000

[54] SMART CARDS

[75] Inventor: Jacek Kowalski, Les Jardins des Seignieres, France

[73] Assignee: Inside Technologies, Saint Clement les Places, France

[21] Appl. No.: 09/043,761

[22] PCT Filed: Oct. 1, 1996

[86] PCT No.: PCT/FR96/01541

§ 371 Date: Mar. 26, 1998

§ 102(e) Date: Mar. 26, 1998

[87] PCT Pub. No.: WO97/14120

PCT Pub. Date: Apr. 17, 1997

[30] Foreign Application Priority Data

Oct. 9, 1995 [FR] France .................................. 95 12176

[51] Int. Cl.[7] ...................................................... G09C 3/08
[52] U.S. Cl. ........................... 713/201; 713/168; 380/255
[58] Field of Search ................................... 380/255, 268; 713/161, 168, 179, 201

[56] References Cited

U.S. PATENT DOCUMENTS

| | | | |
|---|---|---|---|
| 4,218,738 | 8/1980 | Matyas et al. | 380/25 |
| 4,827,450 | 5/1989 | Kowalski | 365/185 |
| 4,847,890 | 7/1989 | Solomon et al. | 379/67 |
| 4,868,489 | 9/1989 | Kowalski | 324/61 P |
| 4,881,199 | 11/1989 | Kowalski | 365/189.01 |
| 4,916,333 | 4/1990 | Kowalski | 307/296.5 |
| 4,962,449 | 10/1990 | Schlesinger | 713/200 |
| 4,962,532 | 10/1990 | Kasiraj et al. | 380/25 |
| 5,022,001 | 6/1991 | Kowalski et al. | 365/185 |
| 5,060,198 | 10/1991 | Kowalski | 365/201 |
| 5,060,261 | 10/1991 | Avenier et al. | 380/3 |
| 5,097,146 | 3/1992 | Kowalski et al. | 307/350 |
| 5,191,498 | 3/1993 | Kowalski | 361/1 |
| 5,291,434 | 3/1994 | Kowalski | 365/96 |
| 5,327,018 | 7/1994 | Karlish et al. | 307/244 |
| 5,381,452 | 1/1995 | Kowalski | 377/26 |
| 5,394,359 | 2/1995 | Kowalski | 365/185 |
| 5,420,412 | 5/1995 | Kowalski | 235/492 |
| 5,442,589 | 8/1995 | Kowalski | 365/225.7 |
| 5,444,412 | 8/1995 | Kowalski | 327/541 |
| 5,448,187 | 9/1995 | Kowalski | 326/81 |
| 5,473,564 | 12/1995 | Kowalski | 365/185.1 |
| 5,512,852 | 4/1996 | Kowalski | 327/206 |
| 5,534,686 | 7/1996 | Kowalski et al. | 235/492 |
| 5,550,919 | 8/1996 | Kowalski | 380/23 |
| 5,552,621 | 9/1996 | Kowalski | 257/321 |
| 5,576,989 | 11/1996 | Kowalski | 365/185.09 |
| 5,721,440 | 2/1998 | Kowalski | 257/300 |
| 5,740,403 | 4/1998 | Kowalski | 395/491 |

FOREIGN PATENT DOCUMENTS

| | | |
|---|---|---|
| 0 409 701 | 1/1991 | European Pat. Off. . |
| 2164939 | 8/1973 | France . |
| 2471003 | 6/1981 | France . |
| WO 92/06451 | 4/1992 | France . |
| WO 92/15074 | 9/1992 | France . |
| WO 92/15096 | 9/1992 | France . |
| 2698195 | 5/1994 | France . |
| WO 94/11829 | 5/1994 | France . |

*Primary Examiner*—Thomas R. Peeso
*Attorney, Agent, or Firm*—Nilles & Nilles, S.C.

[57] ABSTRACT

A logic machine and a circuit for producing an authentication code for authenticating smart cards which include a cycle of steps wherein a bit word is read out of a secret memory with a plurality of bit words, and words read out during previous cycles are combined. The result of the combination is used as a generator word for generating the address of the word to be read out in the next cycle.

11 Claims, 4 Drawing Sheets

SMART CARDS

BACKGROUND OF THE INVENTION

The present invention relates to a method and a circuit for producing an authentication code enabling the access to a microcircuit to be secure.

The present invention relates in particular to the field of smart cards, and more particularly to wired-logic microcircuits that are used in smart cards.

Under the generic term of "chip cards", two principal categories of cards are indeed meant, whose technology is different: on one hand, the microprocessor cards, and, on the other hand, the cards called "smart cards". Unlike microprocessor cards, smart cards are only provided with a wired-logic microcircuit, which offers much fewer possibilities in terms of facility of use, data processing ability, programming, and in particular in terms of security and fraud protection than a microprocessor microcircuit.

In compensation, wired-logic microcircuits have the advantage of a simpler structure and a very low cost price, so that smart cards have had an important development last years for applications where a high level of security was not necessary. Thus the use of pre-payment cards like telephone cards has been generalised. New applications such as electronic purses or electronic keys (in particular in the field of cars) are, at present, being considered for use on a large scale.

It is however necessary that wired-logic microcircuits should provide a much greater security level in the future than at present for the development of these numerous future applications and, as regards security in use, that they should be able to compete with microprocessor circuits which are provided with improved software security mechanisms.

Thus, a general purpose of the present invention is to improve the protection mechanisms of wired-logic microcircuits, keeping in mind that manufacturing costs rise very quickly when sophisticated security functions are to be performed.

As a reminder, FIG. 1 shows the structure and the working of a microcircuit 1 of a conventional smart card. The wired-logic microcircuit 1 mainly comprises a serial memory 2 (i.e. a bit by bit accessible memory), an authentication circuit 3 and a sequential logic circuit 4 which controls the functioning of the various elements by means of a clock signal H which is provided by a terminal 10 into which the card is inserted. The memory 2 contains, stored in bit form, a serial number of the card NI (or identification number of the microcircuit) and transaction data DA, for example data representing the monetary value of the card or a number of telephone pulses. The authentication circuit 3 has a serial input 3-1 for receiving an input code CE and a serial output 3-2 for producing an authentication code CA. Furthermore, the microcircuit 1 is provided with contact pins for the electrical interface with the terminal 10, among which an input-output contact pin I/O for the digital data communication, a contact pin RST for initialising the microcircuit, a contact pin H for the input of the clock signal and two contact pins Vcc and GND for power supply. The output of the memory 2 as well as the input 3-1 and the output 3-2 of the authentication circuit are coupled to the input-output contact pin I/O. The digital data circulate in serial form, that is bit by bit in synchronism with the lock signal, which allows a simplification of the internal structure of the circuit, as the connections between the various elements are limited to one wire only.

When the card is inserted into the terminal 10, the terminal 10 has to determine, for security reasons, if the card is authentic or fraudulent. The authentication circuit 3 thus takes part into a verification procedure as hereunder described for verifying the authenticity of the card. It is first recalled that the terminal 10, which is generally provided with a microprocessor 11 controlled by a programme memory 12, knows the secrets of the security mechanisms introduced into the card.

Step 1—The terminal 10 generates a random binary code ALEXT and applies it as an input code CE to the authentication circuit 3. The circuit 3 transforms the code ALEXT into an authentication code CA which can be written $CA = F_{Ks}$ (ALEXT)

$F_{Ks}$ representing the transformation function, or authentication function, performed by the circuit 3 from a secret key Ks which is at its disposal.

Step 2—In parallel with step 1, the terminal 10, which knows the secret key Ks and the authentication function $F_{Ks}$ (stored as software in the programme memory 12) for its part calculates a code CA' such that $CA' = F_{Ks}$ (ALEXT)

Step 3—The terminal 10 compares the code CA produced by the card and the code CA' calculated by itself. If the two codes are different, the card is not authentic and must be refused by the terminal.

In a known alternative of this method, the terminal 10 does not know the secret key Ks but determines it from the serial number NI and by means of another secret key Kp at its disposal and a transformation function $F_{Kp}$ such as $Ks = F_{Kp}$ (NI)

In this case, step 1 is preceded by a preliminary step wherein the terminal 10 reads the serial number NI out of the memory 2 and uses it to deduce Ks.

Finally, it appears that the protection mechanism against fraud relies entirely upon the authentication function $F_{Ks}$ performed by the circuit 3 and must not be able to be decoded by a fraudulent person.

Therefore, an authentication circuit has to present the following characteristics or advantages to be optimal:
a serial input and a serial output,
the ability to produce a long authentication code, that is of at least 16 bits, after introduction of the input code CE,
a very high security, that is the quasi impossibility for a fraudulent person to find out the internal working of the authentication circuit,
the generation of one bit of the authentication code at each clock pulse,
the production of two very different authentication codes CA from two very similar input codes CE differing for example by one bit only (the same succession of "1" and "0" with only one bit having not the same value).

For the man skilled in the art and as illustrated in FIG. 2, an authentication circuit 3 is a logic machine 6 clocked by a clock signal H, in which is injected a series of bits forming the input code CE in synchronism with the clock signal H and out of which is extracted a series of bits forming the authentication code CA, in synchronism with the clock as well. In the present patent application the term "logic machine" is understood as a logic circuit characterised by an internal logic state at a certain moment, then by another internal (logic) state at a following moment, and so on, able to operate independently, that is to switch from an internal state to another internal state upon reception of a clock signal also when no input code CE is applied to it. The operating mode of the logic machine 6 must be secret and is generally based on a secret key Ks. The introduction of the bits of the input code CE modifies the transitions of the internal states of the logic machine, and the authentication code CA which is serially extracted out of the logic machine is representative of the internal state transitions of the machine.

If it is desired to produce a serial code CA having a certain length, for example a 16 bit code, after the introduction of the input code CE, it is necessary to have at one's disposal a logic machine presenting a large number of internal states and a large diversity in the series of its internal states. For example, to produce an authentication code CA of 16 bits after the introduction of the input code CE, it is necessary to have a logic machine able to perform about 65500 different transitions between its internal states to use all the possibilities offered by the 16 bits of the authentication code (a 16 bit code being able to take about 65500 values).

DISCUSSION OF THE RELATED ART

The prior art, and in particular the French patents FR 92 13913 and FR 89 09734, describes authentication circuits performed with the same kind of machine as the logic machine 6 shown in FIG. 3. The logic machine 6 comprises a secret memory 7 whose parallel output is fed back to the address input ADR through a buffer register 8. The secret memory 7 contains a plurality of binary words M1, M2, . . . Mn representing the secret key Ks. At each clock pulse, the address of the word to be read out of the secret memory is determined partly by the word read during the previous cycle and partly by the bit of the input code CE which is applied on a wire of the address input ADR. The authentication code CA is extracted at the output of the memory 7.

The drawback of such a logic machine is that the transitions between the internal states depend only on the words $M_i$ contained in the secret memory 7 once the input code has been introduced. Thus, for example, if 65000 state transitions are to be obtained once the code CE has been introduced, a secret memory with a capacity of 65000 binary words has to be used, which is not considered in practice for reasons of cost. To avoid these drawbacks, the patent FR 92 13913 proposes to perform several successive inputs of the input code CE into the logic machine before delivering the authentication code CA. This solution however presents the drawback of having to use several clock pulses to obtain one bit only of the authentication code CA, which reduces significantly the operating speed of the authentication circuit and the duration of the authentication procedure.

Therefore an object of the present invention is to provide an improved authentication circuit having the above mentioned characteristics and advantages.

OBJECTS AND SUMMARY OF THE INVENTION

Another object of the invention is to provide a secret memory logic machine and a secret memory authentication circuit which shows a large number of internal states for a limited number of words in the secret memory.

A more particular object of the invention is to provide a logic machine and an authentication circuit able to present about 65000 internal state transitions to be able to produce authentication codes of at least 16 bits.

Yet another object of the invention is to provide a logic machine and an authentication circuit easy to manufacture and with a low cost price.

These objects are obtained by a method of producing an authentication code comprising cycles for reading binary words out of a secret memory containing a plurality of binary words wherein, at each cycle, the read address of a word of the secret memory is generated from a binary word which is the result of a combination operation of words read out of the memory during previous cycles.

It will be later described that it is possible with this method to put into practice a logic machine presenting a large number of different internal states and of transitions between these states, because, according to the invention, the transition from an internal state to another depends not only on the word which has just been read out of the memory, but on the combination of the words read out during previous cycles.

Preferably the combination operation is performed by means of a one-way combination function.

According to one embodiment, the combination operation consists in performing the addition of binary words read out of the secret memory.

Advantageously it is proposed a first transform operation of the address generating word, consisting in logically combining together at least a part of the bits of the address generating word.

Advantageously, it is proposed a second transform operation of the address generating word, consisting in logically combining at least one bit of the address generating word with at least one bit of a pseudo random shift register.

Advantageously, it is proposed a third transform operation of the address generating word consisting in logically reducing the number of bits of the address generating word to a quantity corresponding to the number of the address inputs of the secret memory.

According to one embodiment allowing the production of an authentication code from an input code, it is provided an initialisation phase of the method wherein at least one bit of the address generating word is logically combined with one bit of the input code at each read cycle of the memory, and a phase for producing the authentication code wherein one bit of the address generating word is extracted to generate one bit of the authentication code at each read cycle of the memory.

According to one embodiment, the initialisation phase and the phase for producing the authentication code are performed simultaneously, the authentication code being produced while the input code is being input.

According to one embodiment, the initialisation phase and the phase for producing the authentication code are performed sequentially, the phase for producing the authentication code starting when all bits of the input code have been input during the initialisation phase.

Advantageously, to produce an authentication code of large length, the input code is divided into at least two parts, a first part of the input code is input, then a first part of the authentication code is produced, the second part of the input code is input, then the second part of the authentication code is produced.

The present invention relates also to a logic machine clocked by a clock signal and comprising a secret memory in which a plurality of binary words read out at clock rate are stored, wherein the output of the memory is applied to a first input of a logic circuit, the output of the logic circuit is fed back to a second input of the logic circuit, the logic circuit performs a combination of its two inputs and produces an address generating binary word applied to the address input of the memory.

Thus the logic circuit, because of the combination function that it performs, allows a much larger number of internal states of the logic machine, in the sense that the number of internal states able to be presented by the logic machine is much more larger than the number of words present in the memory.

According to one embodiment, the address generating word is extracted at the output of the logic circuit.

According to one embodiment, the address generating word is extracted at the output of a buffer circuit located between the output and the second input of the logic circuit.

According to one embodiment, the logic circuit is an adder.

According to one embodiment, the logic machine comprises logic means for reducing the bit number of the address generating word.

According to one embodiment, the logic machine comprises logic means for combining bits of the address generating word together.

According to one embodiment, the logic machine comprises a pseudo random shift register and logic means for combining at least one bit of the shift register with at least one bit of the address generating word.

The present invention relates also to an authentication circuit with serial input and output for producing an authentication code from an input code, comprising a logic machine according to the invention, logic means for injecting the input code bit by bit at clock rate into the logic machine and means for extracting at clock rate one bit out of the logic machine as a bit of the authentication code.

BRIEF DESCRIPTION OF THE DRAWINGS

These objects, characteristics and advantages of the present invention as well as other will be described with more details in the following description of a method, a logic machine and an authentication circuit according to the invention, in conjunction with the accompanying drawings, in which.

DESCRIPTION OF THE PREFERRED EMBODIMENTS

It is recalled that an object of the present invention is to propose a logic machine provided with a large number of internal states, which is simple and manufacturable with low costs. It will be then possible to build an improved authentication circuit using this logic machine.

Figure 1:
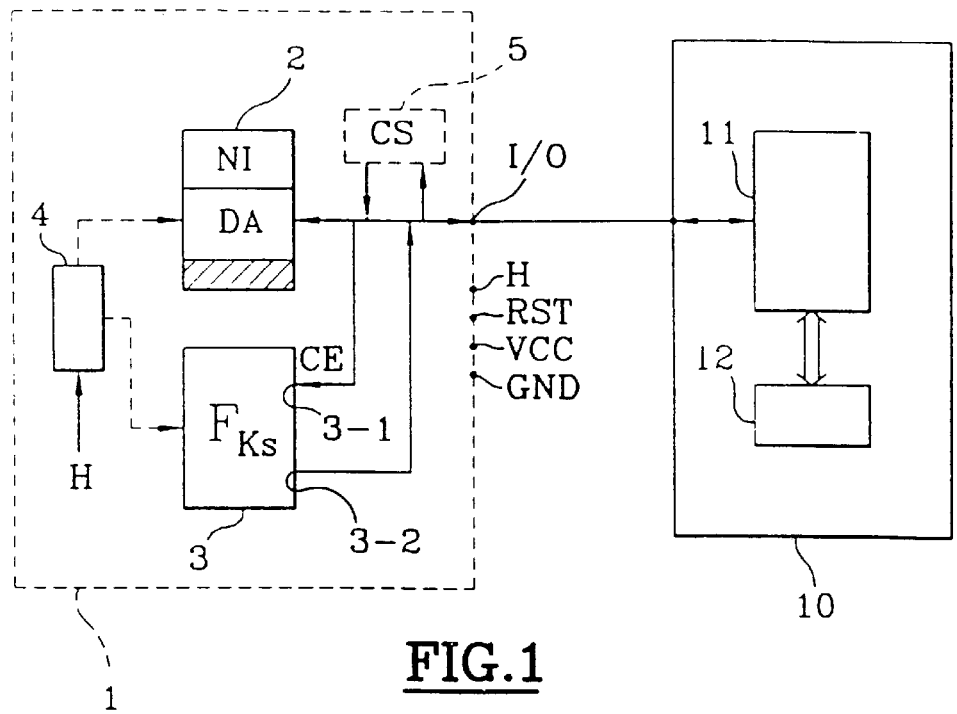
FIG. 1, previously described, is the block diagram of a conventional microcircuit for smart cards, FIG. 2, previously described, shows an authentication circuit implemented in a conventional smart card, FIG. 3, previously described, is the structural diagram of a logic machine of the prior art.
Figure 2:
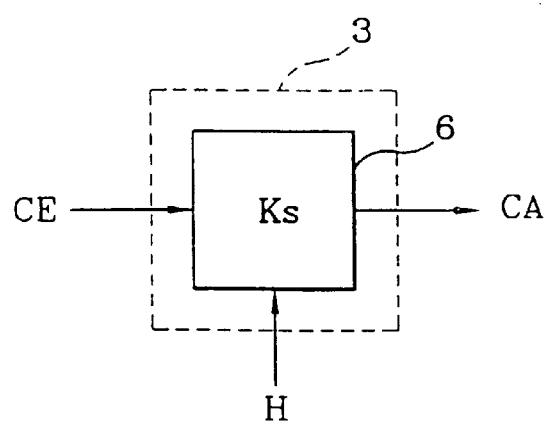
Figure 3:
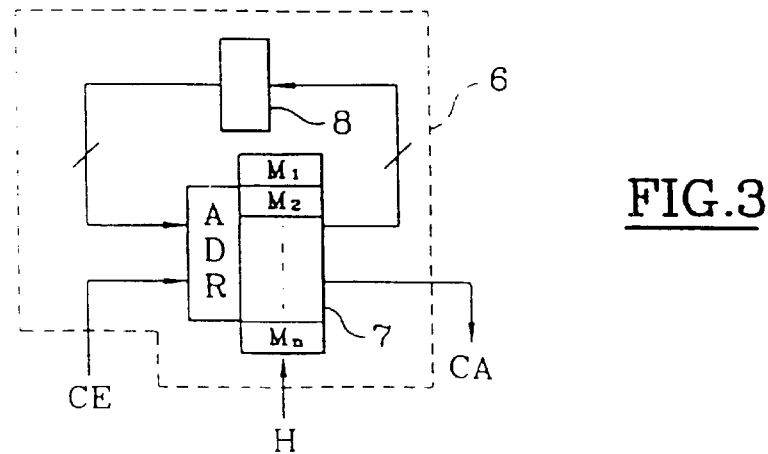
Figure 4:
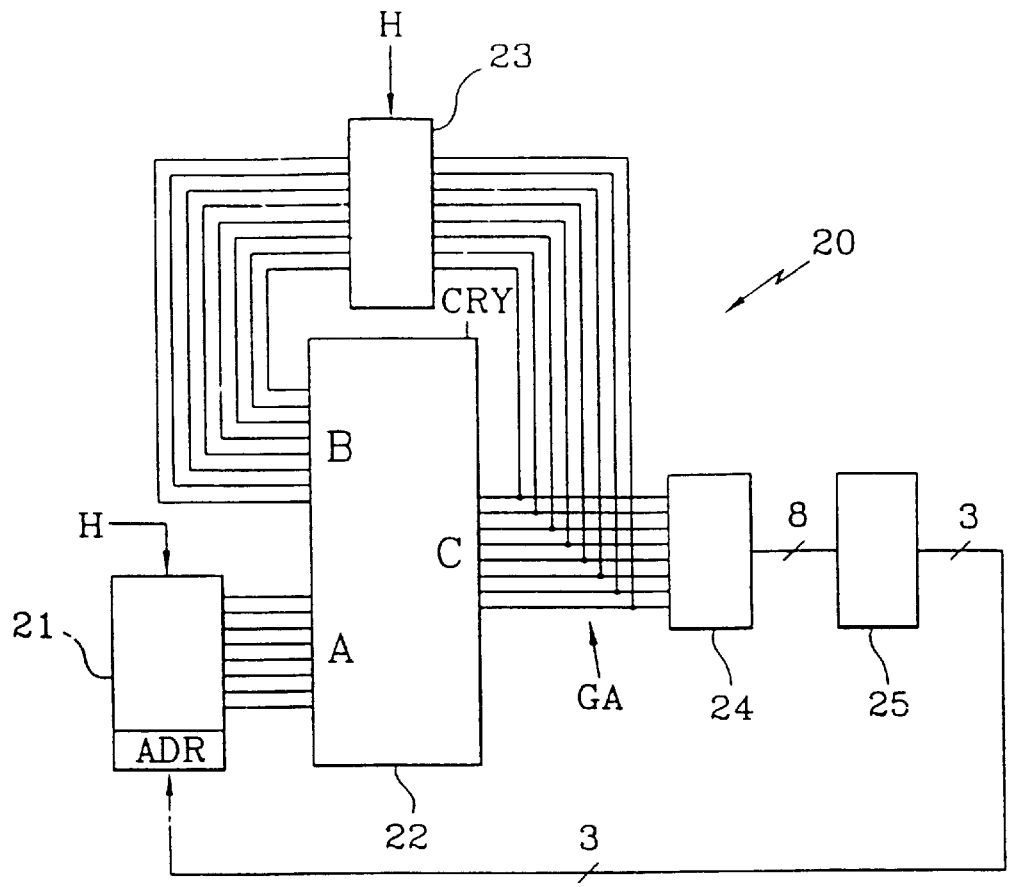
FIG. 4 shows a logic machine according to the invention in block form.

FIG. 4 shows a logic machine 20 according to the invention. The logic machine 20 comprises a secret memory 21 (that is non accessible from outside) controlled by a clock signal H, a logic circuit 22 with two inputs A, B and an output C of the parallel type. The logic machine 20 also comprises a buffer register 23 controlled by the clock signal H, a mixing logic circuit 24 and a reducing logic circuit 25. The memory 21 contains a plurality of binary words forming the secret key Ks of the logic machine 20 and its output is applied to the input A of the circuit 22. The output C of the circuit 22 is applied to the input of the mixing circuit 24 and is also fed back to the input B by means of the buffer register 23. The output of the mixing circuit 24 is applied to the input of the reducing circuit whose output feeds the address input ADR of the memory 21. The mixing circuit 24 is optional and has the function of logically combining the bits of the output C of the circuit 22 to create a "jamming" effect and to render the working of the logic machine 20 as complex and unable to be deciphered as possible. The circuit 25 has the function of reducing the number of bits produced by the circuit 24, if necessary, to obtain the number of bits necessary to control the address input ADR of the memory 21. The circuit 22 performs a combination function Fc of its two inputs A and B and produces a binary word GA at the output C which can be expressed by:

$$GA = A \text{ Fc } B$$

In the following, the word GA is called "address generating word" because, as clearly apparent in FIG. 4, the address value applied to the input ADR of the memory 21 is generated from the word GA.

According to the invention, the combination function Fc is a one-way function, which means that the binary word GA cannot reveal the values of the inputs A and B (the EXCLUSIVE OR function, bit by bit calculated, is for example a one-way function).

When a clock pulse H is applied to the memory 21 and to the buffer register 23, a word read out of the memory 21 is applied to the input A of the circuit 22. In parallel, the word present at the output C of the circuit 22 is copied by the output of the buffer register 23 and applied to the input B of the circuit 22 (the man skilled in the art will notice that a short time shift may be provided in practice between the application of the clock pulse H to the memory 21 and its application to the buffer register 23 for synchronisation reasons).

Thus, if a number n of clock pulses H is applied after a reset to zero of the logic machine 20, the output of the circuit 22 provides, at the $n^{th}$ clock pulse $H_n$, a binary word GA generating the address of the word to be read out at the following clock pulse $H_{n+1}$ which is the result of the combination of the words $M_1, M_2, M_3, M_4, \ldots M_n$ read out of the memory 21 since the first clock pulse. The word GA can be expressed by:

$$GA = M_1 \text{ Fc } M_2 \text{ Fc } M_3 \text{ Fc } M_4 \text{ Fc } M_5 \ldots \text{ Fc } M_n$$

Thus, using the combination operation of the present invention, a large number of different address generating words can be produced from a limited number of words stored in the memory 21, which allows numerous possibilities in terms of state transitions.

In a preferred embodiment due to its simplicity, the circuit 22 is a eight bit adder whose output CRY "carry over" is left unconnected and the memory 21 contains eight binary words of eight bits each. The word GA at the output C of the adder 22 is then a eight bit word, g0 to g7, which constitutes the result of the modulo 255 modular addition of the words $M_1, M_2, M_3, \ldots M_n$ read out of the memory 21:

$$GA = \Sigma \ M_1 \text{ to } M_2 \qquad \text{(modulo 255)}$$

In this case, 256 different address generating words are obtained, that is 256 internal states and 256 possibilities of state transitions, from a secret key Ks comprising only eight words of eight bits.

Figure 5:
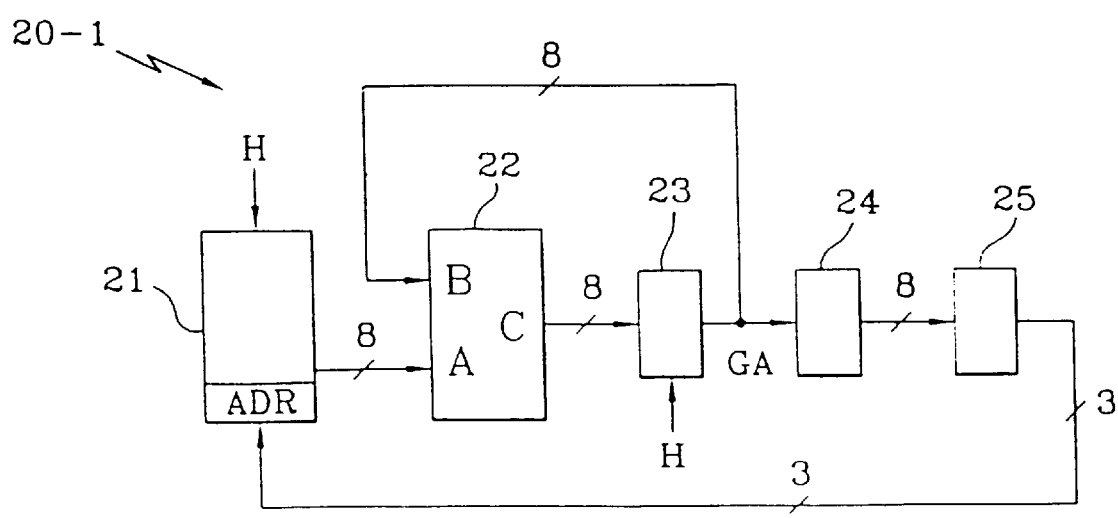
FIG. 5 shows an alternative embodiment of the logic machine of FIG. 4.

An alternative embodiment 20-1 of the logic machine according to the invention is shown in FIG. 5. According to this alternative, the input of the mixing circuit 24 is fed by the output of the buffer register 23, which is still being applied to the input B of the circuit 22. In this case, the address generating word GA is the result of the modulo 255 modular addition of the words $M_1$, $M_2$, $M_3$, ... $M_{n-1}$ read out during the previous clock cycles:

$$GA = \Sigma\ M_1\ \text{to}\ M_{n-1} \qquad \text{(modulo 255)}$$

It is recalled now that a particular object of the present invention is to provide a logic machine presenting about 65000 possible transitions between its internal states, to be able to use the whole scale of a 16 bit code whose production is wished. This result can be achieved simply by replacing the eight bit adder 22 by a sixteen bit adder (that is 65536 possible values for the address generating word GA) while keeping the secret memory with eight words of eight bits. However, this solution is not advantageous for industrial applications because of the extra manufacturing cost involved. The structure is thus preferably limited to a eight bit structure.

Therefore, an idea of the present invention for increasing the possibilities of the logic machine is to use a shift register operating in a pseudo random mode, for example an 8 bit register, and to inject at least one bit of the pseudo random register into the address generating word GA. In this case, the number of internal states of the logic machine is increased up to 256×256, that is about 65000 possibilities, as each internal state of the pseudo random register can be combined with each internal state of the address generating word GA.

Figure 6:
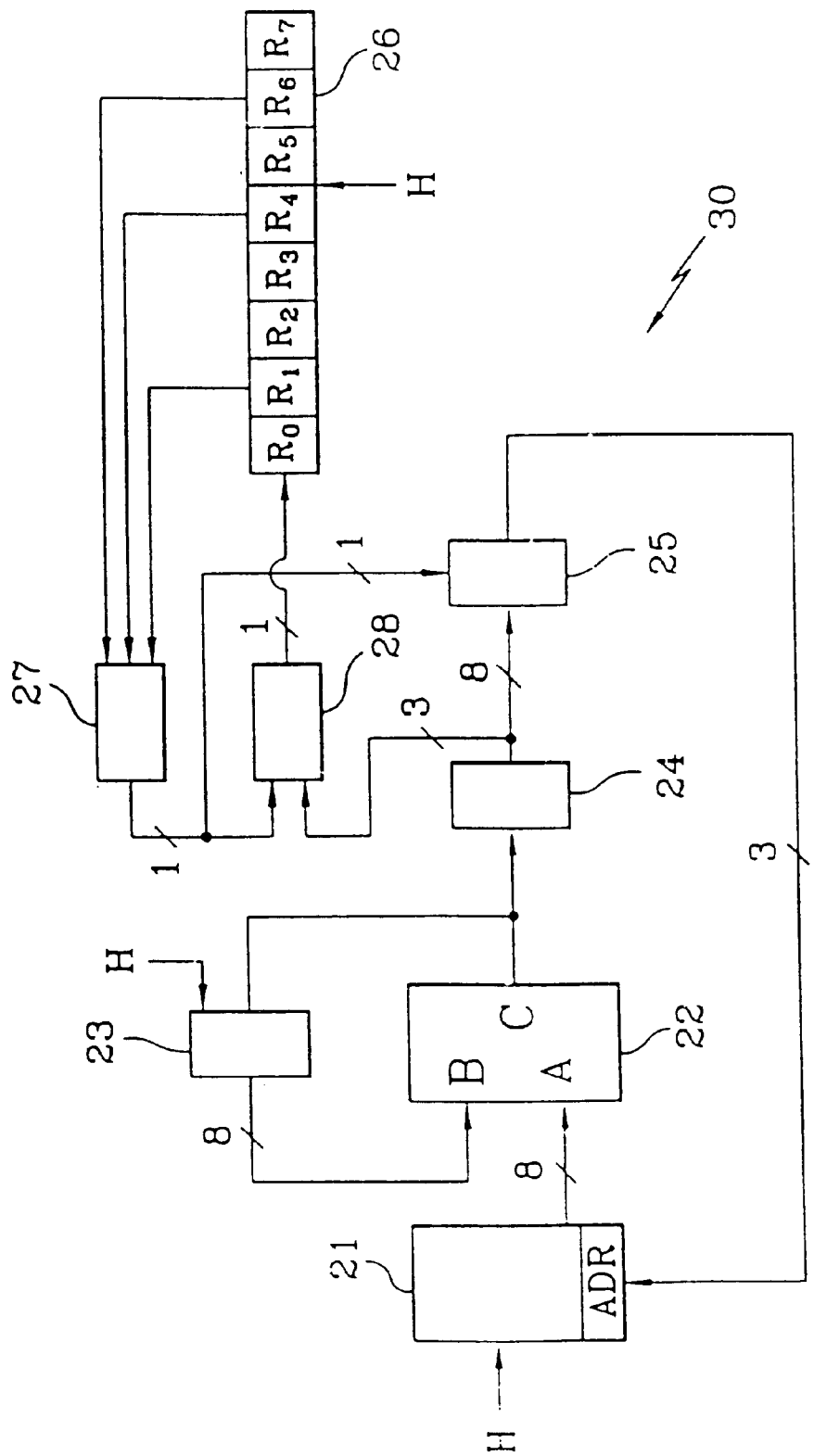
FIG. 6 shows another alternative embodiment of the logic machine of FIG. 4.

FIG. 6 shows a logic machine 30 carrying out this second aspect of the invention. The memory 21 as well as the circuits 22, 23, 24, 25, arranged in the manner described in conjunction with FIG. 4, are also present. Furthermore, the logic machine 30 comprises a shift register 26 of eight bits r0, r1, ... r7, clocked by the clock H and arranged in a pseudo random operating mode.

The pseudo random operating mode of the register 26 is provided when at least one internal bit r0–r7 of the register 26 and at least one bit of the address generating word GA are logically combined together to form the input bit of the register 26 at the following clock pulse. Thus, in the example illustrated by FIG. 6, three bits r1, r4 and r6 of the register 26 are combined in a logic circuit 27 (it is possible to combine more or less bits). The output of the circuit 27 produces a bit which is combined with three bits of the address generating word GA by means of a logic circuit 28 (here also, it is possible to combine more or less bits). The output of the circuit 28 produces a bit applied to the input of the register 26.

Furthermore, in order that the 256 possible internal states of the pseudo random register 26 combine themselves with the 256 possible states of the address generating word GA and provide the logic machine 30 with about 65000 possibilities in terms of state transitions, at least one bit of the pseudo random register 26 must be combined with at least one bit of the address generating word GA. In the example of FIG. 6, the choice was made to apply the bit produced by the circuit 27 to the reducing circuit 25, said bit being representative of the three bits r1, r4, r6 of the register 26.

Preferably, the reducing circuit 25, the circuit 27 and the circuit 28 are linear logic circuits, that is comprising logic functions based on EXCLUSIVE OR gates.

Figure 7:
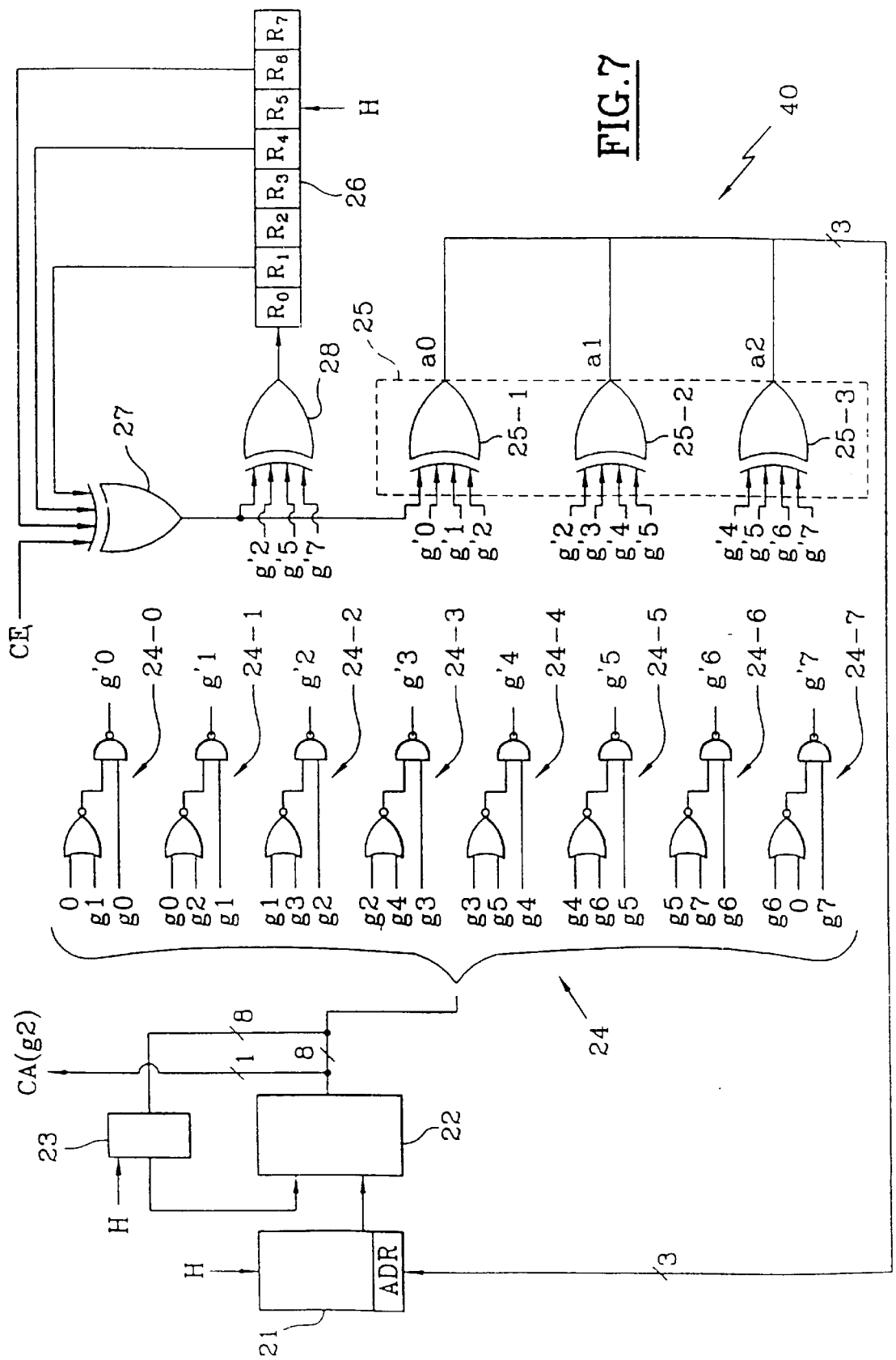
FIG. 7 shows with more details an authentication circuit using the logic machine of FIG. 6.

FIG. 7 shows an embodiment of an authentication circuit 40 using the logic machine 30 which has just been described. The circuit 40 produces an authentication code GA of the serial type from an input code CE which is also of the serial type. The elements that constitute the logic machine 30 are present, that is the secret memory 21 containing the secret key formed by the 8 words of 8 bits, the adder 22, the buffer register 23, the circuits 24, 25, 27, 28 and the register 26.

The mixing circuit 24 comprises eight logic subsets 24-0, 24-1, 24-2 ... 24-7 producing the bits g'0, g'1, g'2 ... g'7 resulting from the logic mixing of the bits g0, g1, g2, g3, ... g7 of the address generating word GA. Each subset 24-0 to 24-7 comprises for example a NOR gate with two inputs whose output is applied to an input of a NAND gate with two inputs. Each $i^{th}$ bit $g'_i$ produced by a subset 24-i has for example the following logic form (the symbol "/" representing the logic NO):

$$g'_i = /(g_i\ \text{AND}\ /(g'_{i+1}\ \text{OR}\ g_{i-1})),$$

except the least significant bit g'0 which has the form of:

$$g'0 = /(g0\ \text{AND}\ /g1)$$

and the most significant bit g'7 which has of the form of:

$$g'7 = /(g7\ \text{AND}\ /g6)$$

Here the input code CE has been introduced at the level of the circuit 27. Thus the circuit 27 is for example an EXCLUSIVE OR gate with four inputs receiving the bit of the input code CE and the three bits r1, r4, r6 of the pseudo random register.

The circuit 28 whose output feeds the input of the pseudo random register 26 is for example an EXCLUSIVE OR gate with four inputs receiving for example the bits g'2 g'5 g'7 of the address generating word GA transformed by the mixing circuit 24 and the bit produced by the EXCLUSIVE OR gate 27.

The reducing circuit 25 comprises for example three EXCLUSIVE OR gates 25-1, 25-2, 25-3 with four inputs, respectively producing the bits a0, a1, a2 applied to the address input ADR of the secret memory 21. The gate 25-1 receives for example at its input the output of the gate 27 and the bits g'0, g'1, g'2, the gate 25-2 the bits g'2, g'3, g'4, g'5 and lastly the gate 25-3 receives the bits g'4, g'5, g'6, g'7.

Finally, the bit of the authentication code CA can be extracted upstream from the point where the input code CE is injected in the circulating direction of the logic states of the bits, for example at the output of the adder 22. It is for example possible to extract the bit g2 of the address generating word GA as a bit for the authentication code CA.

The present invention proposes thus an authentication circuit 40 simple to build which is able to provide an authentication code CA of 16 bits in 16 clock pulses only and enables the use of the 65000 possibilities provided by the code. As in the prior art, the code CA can be expressed by:

$$CA = F_{Ks}\ (CE)$$

$F_{Ks}$ being the transform function performed by the circuit 40 from the secret key Ks which is only constituted by 8 words of 8 bits.

When reading the above description, it will become apparent to the man skilled in the art that the authentication circuit according to the invention can have a lot of alternatives and embodiments, in particular concerning the various combinations of bits allowing the jamming of the operation of the circuit or the multiplication of the number of its internal states. However, as the performance of such a circuit relies upon random and statistical parameters, the man skilled in the art will take care that the particular considered embodiment will really result in the desired performance, in particular by means of conventional computer simulation tools.

Furthermore, the performance offered by the authentication circuit according to the invention allow its use in two ways. In the first way, the input code CE is injected and the authentication code CA is output simultaneously, in synchronism with the clock. In the second way the input code CE is first injected and then the authentication code CA is output, when the whole code CE has been input. With this second method, although if two input codes CE are very similar and differ by one bit only, for example, the produced authentication codes will be very different, which heightens the degree of inviolability of the authentication circuit.

Lastly, if it is wished to produce an authentication code CA of 32 bits from an input code CE of 32 bits but the authentication circuit presents only about 65000 transition possibilities of internal states (covered by a 16 bit code), the present invention proposes a method consisting in:

dividing the input code CE into two codes CE1, CE2 of 16 bits each, injecting first the code CE1 (16 clock pulses), producing a first authentication code CA1 of 16 bits (16 further clock pulses), then injecting the code CE2 (16 clock pulses), and producing then a second authentication code CA2 of 16 bits (16 further clock pulses), the final authentication code being obtained by chaining the codes CA1 and CA2.

Although it has been indicated in the preamble that the purpose of the present invention is to improve smart cards, it is of course obvious that the method and the authentication circuit according to the present invention are suitable for numerous applications and generally relate to any product using a wired-logic microcircuit whose authenticity has to be verified, like contactless electronic tags (operating by means of electromagnetic signals), electronic keys (with or without contact), electronic cards for the identification of persons, etc.

I claim:

1. Method of producing an authentication code (CA), comprising cycles for reading binary words ($M_n$) out of a secret memory (21) comprising a plurality of binary words, wherein, at each cycle, the address for reading a word out of the secret memory (21) is generated from an address generating binary word (GA) forming the result of a combination operation (Fc, $\Sigma$) of words ($M_1$ to $M_n$) read out of the memory during previous cycles, characterised in that it comprises a transform operation of the address generating word (GA) consisting in logically combining at least one bit (g'0, g'1, g'2) of the address generating word (GA) with at least one bit (r1, r4, r6) of a pseudo-random shift register (26).

2. Method according to claim 1, wherein said combining operation of words read out of the memory is the adding operation.

3. Method according claim 1, comprising a transform operation (g'0–g'7) of said address generating word (GA) consisting in logically combining together at least a part of the bits (g0–g7) of the address generating word.

4. Method of producing an authentication code (CA) from an input code (CE) according to claim 1, wherein:

during an initialisation phase of the method, at least one bit (g'0, g'1, g'2) of the address generating word (GA) is logically combined with one bit of the input code (CE) at each reading cycle of the memory, during a phase for producing the authentication code (CA), one bit (g2) of the address generating word (GA) is extracted at each reading cycle of the memory for forming a bit of the authentication code (CA).

5. Method according to claim 4, where n said initialisation phase and said phase for producing the authentication code (CA) are performed simultaneously, the authentication code (CA) being produced while said input code (CE) is being input.

6. Method according to claim 4, wherein said initialisation phase and said phase for producing the authentication code (CA) are performed sequentially, the phase for producing the authentication code starting when all bits of the input code (CE) have been input during the initialisation phase.

7. Method according to claim 6, for producing an authentication code (CA) of large length, wherein the input code (CE) is divided into at least two parts (CE1, CE2), a first part (CE1) of the input code is input, then a first part (CA1) of the authentication code (CA) is produced, the second part (CE2) of the input code is input, then the second part (CA2) of the authentication code (CA) is produced.

8. Logic machine (20, 20-1, 30) clocked by a clock signal (H), comprising a secret memory (21) in which a plurality of binary words read out at clock rate are stored, wherein the output of the memory (21) is applied to a first input (A) of a logic circuit (22) whose output (C) is fed back to the second input (B), the logic circuit (22) performing a combination (Fc, "+") of its two inputs (A, B) and producing an address generating binary word (GA) supplied to the address input (ADR) of the memory, characterised in that it comprises a pseudo-random shift register (26) and logic means (25-1, 27) for combining at least one bit (r1, r4, r6) of the shift register (26) with at least one bit (g'0, g'1, g'2) of the address generating word (GA).

9. Machine according to claim 8, wherein said logic circuit (22) is an adder.

10. Machine according to claim 8, comprising logic means (24) for combining bits (g0–g7) of the address generating word (GA) together.

11. Authentication circuit (40) with serial input and output, for producing an authentication code (CA) from an input code (CE), characterised in that it comprises:

a logic machine (30) according to one of the claims 8 to 10, logic means (25-1, 27) for injecting the input code (CE) bit by bit into the logic machine (30), at clock rate, and means for extracting, at clock rate, a bit (g2) out of the logic machine (30) as a bit of said authentication code (CA).

* * * * *